United States Patent [19]

Huber

[11] 3,813,648

[45] May 28, 1974

[54] APPARATUS AND PROCESS FOR DISTRIBUTION OF OPERATION DEMANDS IN A PROGRAMMED CONTROLLED DATA EXCHANGE SYSTEM

[75] Inventor: Josef Huber, Munich, Germany

[73] Assignee: Siemens Aktiengesellschaft, Berlin and Munich, Germany

[22] Filed: June 9, 1971

[21] Appl. No.: 151,448

[30] Foreign Application Priority Data

June 9, 1970 Germany ........................... 2028345

[52] U.S. Cl. ........................................ 340/172.5

[51] Int. Cl. ........................................ G06f 9/18

[58] Field of Search ............................ 340/172.5

[56] References Cited

UNITED STATES PATENTS

| | | | |
|---|---|---|---|
| 3,200,380 | 8/1965 | MacDonald et al. | 340/172.5 |
| 3,317,898 | 5/1967 | Hellerman | 340/172.5 |
| 3,346,851 | 10/1967 | Thornton et al. | 340/172.5 |
| 3,483,521 | 12/1969 | Frasier et al. | 340/172.5 |
| 3,496,551 | 2/1970 | Driscoll et al. | 340/172.5 |
| 3,500,329 | 3/1970 | Couleur et al. | 340/172.5 |
| 3,530,438 | 9/1970 | Mellen et al. | 340/172.5 |
| 3,560,935 | 2/1971 | Beers | 340/172.5 |
| 3,611,305 | 10/1971 | Greenspan | 340/172.5 |

*Primary Examiner*—Gareth D. Shaw
*Assistant Examiner*—John P. Vandenburg
*Attorney, Agent, or Firm*—Birch, Swindler, McKie & Beckett

[57] ABSTRACT

A process and apparatus are described for operating a program controlled data exchange system having at least one central memory constructed in the form of a multistorage unit containing programs necessary for the operation of the system. The system also has processing units which operate cyclically with the central memory over a memory input-output control according to the principles of demand and call-back. The reception, distribution and selection of operation demands sent by the processing units take place at a central location over an operation demand control in which an operation distribution register contains a specific association given through address and contents between storable information about the priority of an operation and the information about the processing unit carrying out an operation. For the targeted distribution of operation demands the information about the priority of an operation to be carried out serves as an internal register address for a seeking operation in the operation distribution register. The aforementioned seeking process results in information being available for the identification of the processing unit carrying out this operation. For the selection of operation demands the processing units initiate an associative seeking process, after the completion of an operation. During the seeking process, the entire contents of the operation distribution register are available for a comparison process for which comparison the information identifying the demanding processing unit serves as comparison criteria. Resulting from this comparison, the information stored for this processing unit in the operation demand control about the highest priority of an operation is available.

4 Claims, 3 Drawing Figures

APPARATUS AND PROCESS FOR DISTRIBUTION OF OPERATION DEMANDS IN A PROGRAMMED CONTROLLED DATA EXCHANGE SYSTEM

BACKGROUND OF THE INVENTION

The invention relates to a process for the operation of a program controlled data exchange system with at least one central memory containing the data and programs necessary for the operation of the system and constructed as a multi-storage unit and with processing units which work cyclically together with the central memory over a memory input - output control according to the principle of demand and recall.

In a known programmed controlled data exchange system (for example, see U.S. Pat. No. 3,717,723), the transmission of information between feeders offering information and receivers accepting information takes place in such a way that only the changes in condition, i.e., the polarity changes, within a message are evaluated and transmitted. The relationship between feeders and receivers is contained in a central memory, which in addition contains still further data and programs necessary for the operation of the exchange system.

To improve the flexibility of a system which works according to this principle it has already been suggested to provide in addition to the system unit which processes the information offered by the feeder still further system units for the carrying out of other tasks. In this manner, a system can be created, which includes at least one memory unit and a plurality of system units which cooperate with this memory unit, which are also called processing units. In accord with their activities and tasks in a data exchange system, the system units can usefully be designated as line connection units, as program control units, as command control unit and as apparatus connection unit. The line connection unit, to which the feeders and receivers are connected, takes over the picking up and passing on of polarity changes as parts of the information to be transmitted. The program control unit coordinates the individual tasks in the system. The command control unit is present for the testing and operating of the system by the operating personnel. Finally, the apparatus connection unit makes it possible to connect external devices to the system.

Because all of the data and programs necessary for the operation of the system are located in the central memory unit, it is essential, that each of the aforementioned units has access to the memory, i.e., that information paths are provided from and to the memory. It has previously been further suggested to control the cyclic production of information paths from and to the memory over a memory input - output control. A selection circuit contained in the memory input - output control makes it possible to subdivide the central memory unit into independent memory sub-units. In this context one speaks of a so-called multi-memory unit. A data exchange system constructed according to this suggestion distinguishes itself in that the information contained at a central location, namely in the central memory, can be reached with a short access time by each of the processing units entering into traffic with the memory. In addition, the memory cycles demanded by the processing units are selected and distributed by the selection circuit contained in the memory input - output control in such a way that at a given time cycles are simultaneously running in a plurality of memory sub-units. The foregoing principles are described in commonly assigned U.S. application Ser. No. 61,692, filed Aug. 6, 1970.

An example constructed according to these suggestions is represented in FIG. 1. The processing units VEI through VEn continually traffic cyclically over a memory input - output control SEAS with the memory sub-units, the so-called memory banks SBI through SBm. The memory input - output control SEAS contains an input circuit ES and an output circuit AS as well as an input selection circuit EAWS and an output selection circuit AAWS associated therewith. Each memory bank SBI through SBm contains an individual memory operation control SOPS and a series of core storages KS. The control channels c are present for the transmission of control signals, which are sent out from the processing units, over which channels the processing units VEI through VEn have access to the memory input - output control SEAS and therefrom to the individual memory banks SBI through SBm. The control channels *d* are present in the direction from the memory banks to the memory input - output control or from there to the individual processing units. For the transmission of information, information channels are provided, which in any given case are available for the duration of at least one cycle to the processing units demanding a cycle. Between the processing units VEI through VEn and the memory input - output control SEAS these channels are designated with *a*, and between the memory banks SBI through SBm and the memory input - output control SEAS they are designated *b*.

The individual processing units VEI through VEn direct their requests for the assignment of a memory cycle in the form of cycle demand signals together with an instruction as to the address of the desired part in the central memory in the form of the so-called memory word address SWAD over the control lines *c* to the memory input - output control SEAS. In the input selection circuit EAWS a selection is made according to the priorities of the demanding processing units, whereby the occupation condition of the requested memory, i.e., the requested memory bank, is also simultaneously taken into consideration. The affected memory bank SB is reached over the control lines *c*. With the following cycle an information channel *a* (between the demanding processing unit and the input circuit ES in the memory input - output control SEAS) and *b* (between the input circuit ES and the memory bank SB) will be made available. If information is to be transmitted from one of the memory banks to one of the processing units an information channel over the output circuit AS in the memory input - output control SEAS will be made available by sending a request signal and selecting the signal within the output selection circuit AAWS in the same way. To increase the reliability the individual processing units as well as also the memory unit can be multiply present.

The memory input - output control SEAS thus regulates the traffic between the individual processing units and the central memory. However, in addition it is also necessary, that the processing units can enter into connections between themselves. In correspondence with the principles of data exchange systems, the individual processing units work in parallel and/or independent from each other, i.e., the individual processing units can always enter into connection only over the central memory.

The necessity for cooperation between individual processing units of the system results from the fact that processing units are organized in any given case in a task oriented manner. Accordingly, the individual processing units must be in a position to mutually stimulate themselves to carry out certain operations, to carry out certain operations in response to such a stimulus and to make information available. Because certain individual operations are of higher value than others, thus are to be handled with priority before other operations, it is necessary to take up the requests in a manner which indicates their priority and in a form recognizable in a central location by the system. Another problem is simultaneously connected with this one, which consists of insuring a priority dependent selection of the received operations requests.

SUMMARY OF THE INVENTION

The invention described in the following pertains in general to a data exchange system of the type described hereinabove in the introduction. It is especially based on the problem of making possible a cyclic traffic between the individual processing units of such a system while fulfilling the aforementioned requirements. The inventive solution is thereby characterized, that receipt distribution and selection of the operation requests sent by the processing units takes place at a central location over an operation request control, in which an operation distribution register contains a specific correlation given through address and contents between storable information about the priority of an operation and the information about the processing unit carrying out an operation. For the desired distribution of operation requests the information about the priority of the operation to be carried out serves as internal register address for a seeking operation in the operation distribution register. The latter results in information being available for the determination of the processing unit carrying out this operation. For the selection of operation requests the processing units instigate an associative search operation after the completion of an operation, in the course of which the entire contents of the operation distribution register are available for a comparison operation, for which the information determining the demanding processing unit serves as comparison criterion, and as the result of which, the information stored in the operation demand control for this processing unit about the priority of highest value of an operation is available.

In accord with the invention, the information about the priority of an operation is stored in the central operation demand control. In addition, it is suggested in accord with a further modification of the invention to assign each priority envisioned in the system a specific register location, which can be reached through an address formed from the information sent by the demanding processing unit about the memory word address and at which an operation bit is placed for the picking up and storing of operation demands. The storage of the operation demands can thereby take place in a part of the operation distribution register or in an individual register.

The following explanations proceed from the assumption that a specific register location in a variable part of an individual register, the so-called operation demand register corresponds to the priority of an operation. The register location is controlled through the address formed from the information, the so-called memory word address, sent by the demanding processing unit. Each location in the operation demand register is clearly specified in this manner by a specific number, hereafter called the AB- number. Pick-up and storage of operation demands takes place in that an operation bit is placed at the location specified by the AB- -number. Thereby in conjunction with the operation distribution register the possibility will be opened up, through the association (assignment) contained there between an information directing to the operation demand register, i.e., the information about the priority of the operation (AB- -number), and a specific processing unit, i.e., the information identifying that processing unit which carries out this operation (VE-number), of achieving a variable distribution of the operation bit placed in the variable part of the operation demand register. Because in the pursuit of this process an operation distribution register with associative behavior is utilized, their results the further advantage, of not only producing an unambiguous association between the information of the operation demand register fixing the priorities of operations as address and the information about the processing unit carrying these operations as contents, rather also vice versa of creating an association between the processing units ready for the carrying out of operations and certain waiting operation demands taking into consideration the priorities assigned to them. In contrast to previously known procedures for the reception and distribution of operation demands, in which the entire activity lay on the side of the processing unit carrying out the operations, in the process according to the invention a substantial part of the activity lies with the central operation demand control, which leads to a considerable reduction of the decentral (peripheral) expense. At the same time a saving of memory cycles is also bound therewith which has a result, that previously present channels, for example the channels present between the processing units and the memory input - output control can be used therewith.

Within the framework of the invention it is possible to change in a programmed manner the associative relationship contained in the operation distribution register between a processing unit, from which an operation demand goes out, and a processing unit, in which this operation is to be carried out. Such a change of association can be controlled with special advantage by the processing units, which are present for the coordination of the tasks within the system, the so-called program controll units. These have the possibility of changing the operation distribution register through special operations.

Because the reception of operation demands or their storage takes place at a central location, preferably in the operation demand register, there results a series of advantageous possibilities for taking into consideration the priority of an operation. In the framework of the invention a setting operation can take place in a dual coded manner in the operation demand register for geometrically over the information of specific memory calls of the central memory. In the first case a code characterizing the AB-bit-number will be given out by the processing unit desiring an operation cycle in addition to a signal indicating the mode of operation designated as "set." In the second case a group of operation bits, whose numerical position is determined by the memory cell it is directed toward, is indicated with a certain memory operation by the processing unit desiring an operation. In both cases a memory cycle is necessary therefor. There is, however, also a setting operation which can be carried out without a memory cycle, which opens up the possibility of setting one or more than one bit in the variable part of the operation demand register directly from a processing unit, for example special lines.

BRIEF DESCRIPTION OF THE DRAWINGS

The principles of the invention will be best understood by reference to a description of a preferred embodiment given hereinbelow in conjunction with the drawings in which.

DETAILED DESCRIPTION OF THE DRAWINGS

Figure 2:
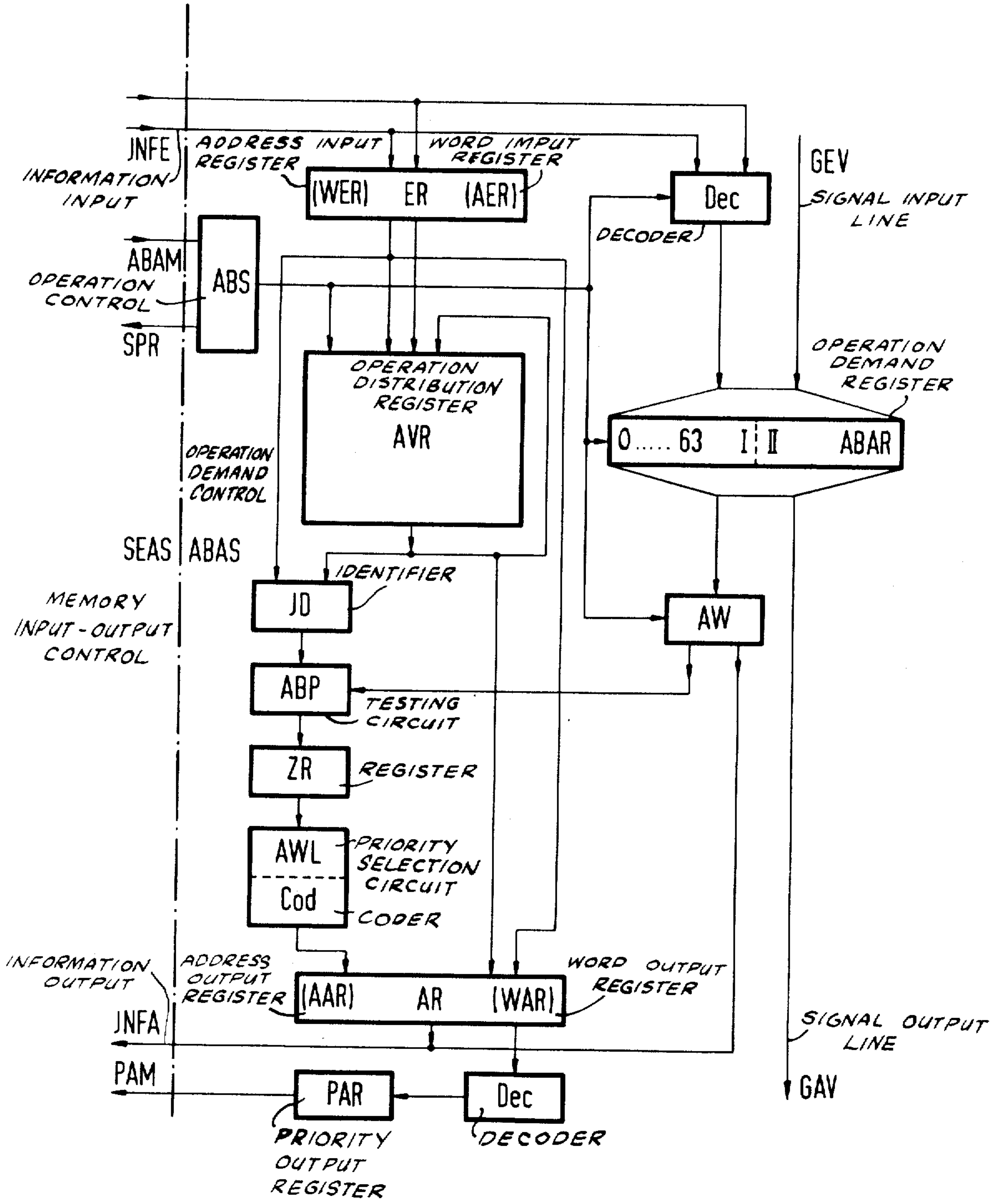
FIG. 2 illustrates exemplary means for performing the inventive process in the FIG. 1 system.

In FIG. 2 the essential operation demand control ABAS is represented in the form of a block circuit diagram with only those details being shown as are necessary for the understanding of the invention. The operation demand control ABAS contains an operation distribution register AVR, which is, as discussed hereinbelow in connection with FIG. 3, formed from groups of conventional shift registers an operation demand register ABAR which is formed in the known manner from conventional bistable circuits and a control circuit ABS, which as is clear from the functional description of the control circuit given hereinbelow is constructed from conventional decoding gate circuits for the evaluation of the control information indicating the mode of operation and which forms the command signals by decoding the foregoing control information. The operation demand control ABS is connected over a control information input to the memory input - output control SEAS and receives via the information and control channels, over which the memory input - output control communicates with the processing units the control information ABAM. For the input of information an input register ER having a word input register WER and an address input register AER is connected in front of the operation distribution register AVR. For decoding AB number conventional data decoding circuits D1 and D2 are provided. The output takes place over an output register AR likewise containing word output register WAR and address output register AAR. The information to be sent from operation demand control ABAS is transmitted over the information outputs INFA and PAM to the memory input-output control SEAS.

The operation demand register ABAR contained in the operation demand controls ABAS serves for the storage of the operation demands sent by the processing units. The number of places of the operation demand register ABAR corresponds thereby to the number of the operation priorities possible in the system. Each operation, i.e., each wired or or each programmed operation is assigned one bit, the so-called operation bit or AB-bit. The position of the individual bits in the operation demand register, which in any given case are defined by an AB- -number, thereby indicates the priority, with which an operation is to be handled. The operation demand register ABAR, which register is, as well, contructed in the known manner from a series of bistable circuits is sub-divided into a first part I and a second part II. The part I is substantially available for wired operation processes or for memory programmed operations in the processing units. The part II is available for the identification of operating conditions and for wired error operations. The AB-bits placed there are permanently distributed, i.e., they can be fixed to the processing units through a one time association. In contrast thereto the AB-bits of part I in the operation demand register ABAR can be variably placed. This part can thus be controlled toward a target corresponding to the information coming over the information input INFE from a processing unit desiring an operation. Each processing unit has the opportunity to assign a certain priority to the demand going out from it. This information, as noted, is called an AB number and can, for example, be formed from six bits. By decoding this information one of 64 specific locations is set in this part of the operation demand register. As mentioned, the setting can take place with a memory cycle or directly. For the latter case the signal input line GEV (for the input) and a signal output line GAV (for the output) are provided. In the present working example 64 priority steps (places 0 through 63 in part I) are possible. The AB- -number identifying a specific location in the variable part I of the operation demand register ABAR simultaneously represents a part of the contents of the operation distribution register AVR. Each AB- -number is there assigned a specific processing unit through itsprocessing unit-number, hereinbelow referenced to as VE-number. Thereby, the operation distribution register AVR always contains an unequivocal association between the information determining the priority of an operation, namely the AB-bit number and the processing unit in which this operation is to be carried out which is identified by the VE number. Such an association can be fixed at one time; however it can also, as will be explained later, be set within the framework of a special program.

After the completion of an operation executed in the operation demand control ABAS, information about the processing unit carrying out an operation is available in the word output register WAR in the form of the so-called VE-number. For the giving out of this information there is a priority output notifying register PAR, which is connected over an output PAM with the memory input - output control SEAS; output PAM reaches the specific processing unit in a manner not described here. The information AB number concerning the priority of an operation is available in the aforementioned address output register AAR. The latter register is connected to the address input register AER, and it is connected to the operation distribution register ABR over the evaluator, or conventional data comparator, ID, binary register ZR, a priority selection circuit AWL and a conventional data coder Cod. The processing unit which has been reached by the information from the DE number is simultaneously offered the information about the priority of the operation over the output INFA. Based on this information a selection between operations of different priority can be made in the processing unit, that is to say the processing of a currently running lower value operation can be interrupted.

In the following the processes necessary for the understanding of the invention will now be described for two cases. The first of the two processes is the distribution process for operation demands wherein a processing unit must give off a demand for the performance of a operation in another processing unit. The second case involves a selection process for operation demands wherein a processing unit having received a demand by the aforementioned distribution process must find further demands, which are stored in the operation demand register. In a manner not represented here the, for the distribution process, demanding processing units directs a memory cycle demand and information via the memory input - output control SEAS. The information is part of the memory word address and contains the information in coded form, for example, six bits for the AB number, four bits for the VE number and a marking bit, the first of which is necessary for the placing of the operation bit. This information is available to the operation demand control ABAS over the input INFE. Simultaneously a control signal ABAM, for example a three bit data signal, for the mode of operation is also routed to to the control circuit ABS within the operation demand control ABAS. The operation control ABS decodes the control information ABAM forming a signal for the operation to be carried out. In this example, this is the command signal SET and DISTRIBUTE. Information about the priority of the operation to be carried out in the form of the AB-bit-number is available at the input of the operation distribution register AVR over the input register AER, which information after decoding within a known decoding circuit D1 serves as an internal register address for 64 locations. However, this information also simultaneously reaches the input of the operation demand register ABAR over a decoding circuit Dec. With the help of the decoded address, an AB-bit is placed in the location in the part I formed by, for example, 64 bistable circuits associated with the pertinent AB-bit-number is set. This relates to the so-called setting process of the operation demand register ABAR mentioned in the introduction. With the controlling of the operation distribution register AVR, an individual cycle is simultaneously started in this register. At the decoded arrival of the AB-bit-number for the latter cycle which serves as internal register address for a word to be read in the operation distribution register, and this word represents the VE number of that processing unit to which the demand is to be transmitted. After reading out this word it is taken over in the word output register WAR. Therewith a piece of information associated with the desired party, i.e., with the decoded AB-bit-number, about the address of the processing unit in which the desired operation is to be carried out is available. The output of the word to the identified processing unit takes place after the end of the cycle of the operation distribution register AVR. The information destroyed with the reading out from the operation distribution register AVR is written in again in a known manner therewith. The content of the word output register WAR is taken over in the priority output notifying register PAR and is transmitted over the information output PAN and over the SEAS as a priority output notification to the specified individual processing unit. During the distribution process the AB number is transmitted directly to the address output register AAR and is transmitted therefrom from the information output INFA.

This information is offered in a known manner to the processing unit over the word lines of the SEAS. Because the distribution of demands is carried out from now on in the central operation demand control ABAS, the input and output selection process in the memory input output control SEAS is blocked at the time of the output (at the same time as the distribution). This takes place once again over the operation control ABS through the control signal SPR.

In the processing unit reached in this manner which has to carry out the desired operation, at the arrival of the priority output notification, the AB-number is taken over in a so-called take over register of the processing unit VE. Thereupon, a comparison of the newly arrived AB-bit with the contents of a priority exchange register present in the processing unit is switched on. If the arrived demand pertains to a higher priority demand than those which are already stored or are being executed in the processing unit, then the last arrived priority given by the AB-number is taken over in the priority exchange register, and the priority last entered therein is erased. In a manner not described here, it is then decided whether the newly taken over operation demand must lead to the interruption of the present operation of the processing unit. In case that no interruption must take place, the reception of the demand operation will begin immediately after the completion of the running operation. In case an interruption is to take place, the operation is interrupted after the carrying out of a running command.

The described processes in the processing unit designated for the carrying out of the selection process operation are important for the understanding of the invention insofar as only demands with increasing priority are taken over in the priority exchange register of the processing unit. If, for example, a number of entries have been made and if the last arrived demand is being processed, then the previously arrived lower value demands in the processing unit are lost. For this reason, it is necessary that for a processing unit carrying out an operation, which processing unit thereby erases the operation demand in the priority exchange register belonging to the operation, the priority of highest current value for the pertinent processing unit can always be newly determined after each start of an operation or after each interruption. The latter process is referred to herein as a selection process. According to the invention, this takes place in that, each processing unit after the beginning of an operation, causes a new selection of the AB-numbers being stored for that processing unit in the operation demand register ABAR for the purpose of selecting the AB-bit of highest value at the time. For this selection process the VE-number of the affected processing unit is, and the AB number being assigned to the last operation is sent to the operation demand controls ABAS, via the information input INFE. As a result of this selection process, the last AB number being placed within the demand register ABAR is cleared and the highest value AB-bit number being placed for that processing unit at that time is determined. In accordance with the invention, this is achieved through an associative seeking operation in the operation distribution register AVR of the operation demand control ABAS. Also in this case, the process is introduced with a memory cycle demand going out from the processing unit, whereby simultaneously, a certain control signal indicating the mode of operation of a selection process is available over the input ABAM of the operation control ABS. After assignment of a memory cycle, the VE-number, for example, a four bit information signal with a marking bit of the processing unit desiring the selection process is taken over in the work input register WER of the ABAS in accordance with the signal from the operation control ABS. The association between the specific VE-number and a certain AB-bit-number being stored for that processing unit is carried out within the framework of a comparison within the identification circuit IB, which is of known construction, whereby the sequence of the VE-numbers run through with a cycle of the operation distribution register AVR is such that the highest value AB-bit-numbers are checked first. This comparison takes place in an identification device ID. The result of the comparison represents information about the association between a specific VE-number read out of AVR and the VE number contained in the word input register WER and also between the defined VE number and one or more than one AB-bit-number.

To be sure, further processes are now still required, because it does not follow from the association which has been determined, whether or not the location corresponding to the AB-bit-number which has been found by said comparison, is placed in the operation demand register ABAR and in case that more than one AB- -number is associated with that processing unit which has an AB number which has the highest priority. For this purpose, the result appearing at the output of the identification device ID is made available to an operation checking device ABP, which for this purpose, receives information about the contents of the part I in the operation demand register ABAR. The demand selection circuit AW is a gate network and is controlled by a command signal "select". In further operation two types of result formations are now possible. In the case that only one AB- -number is associated with a specific VE-number, it merely has to be checked whether the location assigned to this AB- -number is placed in the oper-ation demand register ABAR. If the test yields the result that the location determined by the AB- -number is placed in the operation demand register ABAR, then this AB- -number is taken over in an intermediate register ZR and passed on to the output register AAR after coding in the coding device Cod. This information indicating the priority of the operation to be carried out reaches the word lines of the processing unit over the memory input output control SEAS. The VE number has, thus, been received directly in the word output register WAR. Therefore, once again, the processing unit is offered a priority output notification via decoding circuit D3, register PAR and information output PAM. In this manner, the presently set AB-bit with the highest priority is available for the specific processing unit, which has demanded in a targeted manner the selection through its VE-number.

For the case that several AB-bit-numbers are associated in the operation distribution register AVR with the BE number of the processing unit initiating the selection process and if one or more of that AB-numbers are also set (located) in the operation demand register ABAR, several AB-bit-numbers are also routed to the intermediate register ZR. In a selection logic, AWL, which for example, forms a part of the code device Cod, the AB- -number assigned at that time the highest operation priority is given out in this case in a known manner.

Figure 1:
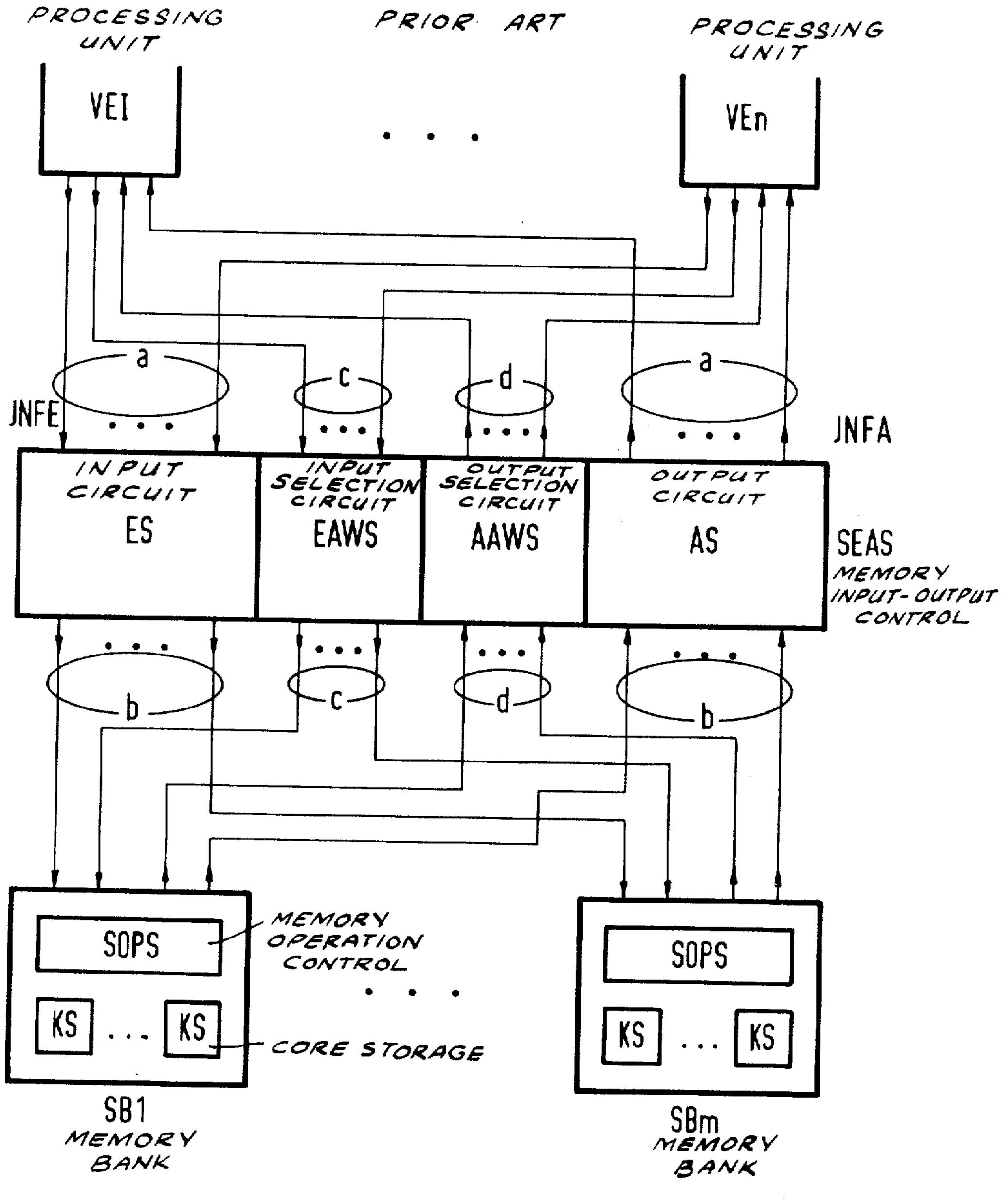
FIG. 1, described hereinabove, illustrates a known data exchange system.
Figure 3:
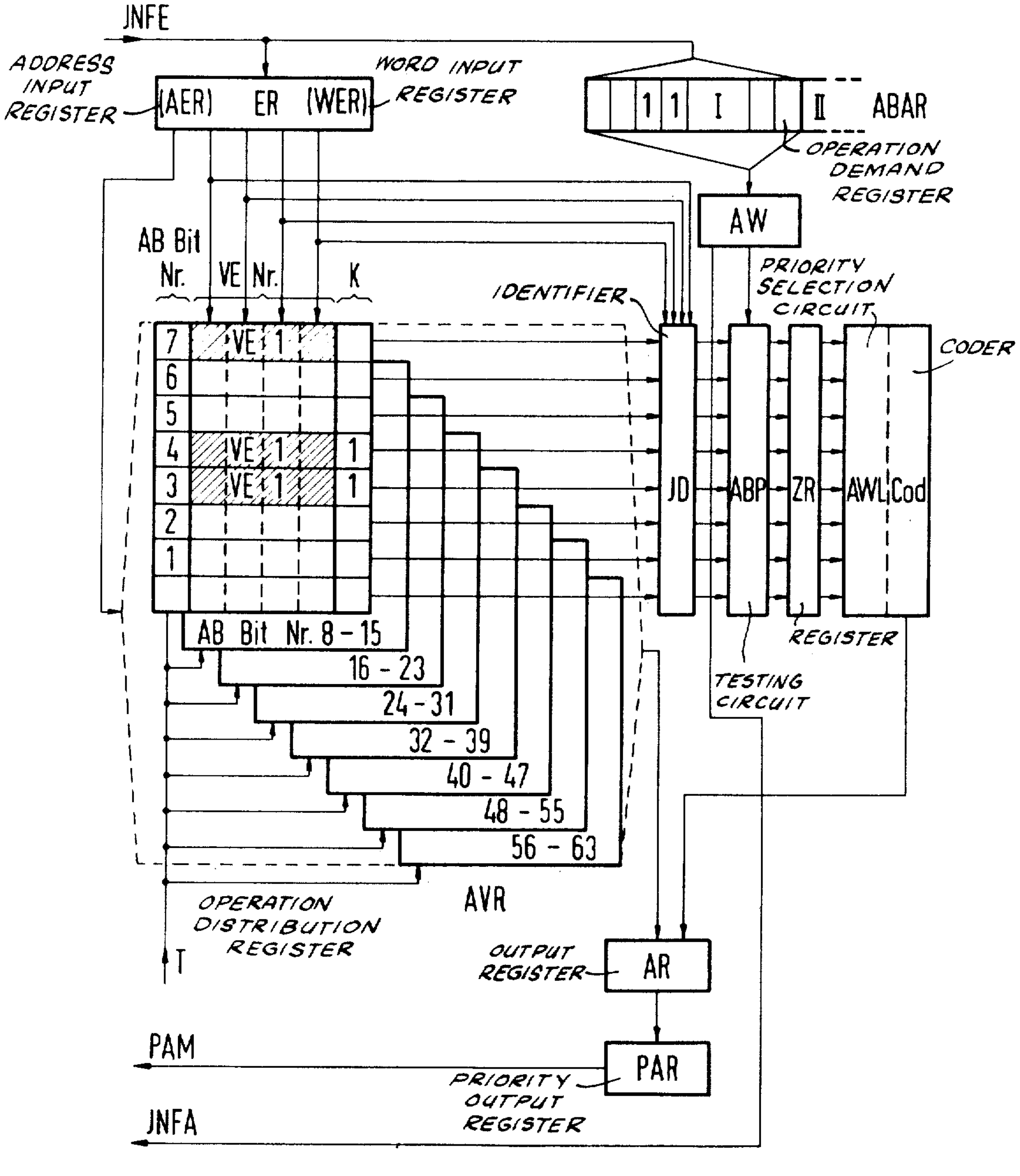
FIG. 3 is a more detailed illustration of the FIG. 2 example.

An explanation of the section process and therewith also of the associative manner of operation of the operation distribution register AVR will be given with reference to a working example represented in FIG. 3, wherein the previously used designations have been retained. The operation distribution register AVR is realized there through eight shift registers. Thus, 8-bit-shift registers are used which are arranged in such a way that a bit parallel and work parallel input and output results.

The AB- -numbers contained columnwise in the operation distribution register AVR are assigned in the corresponding lines the VE-numbers of the processing units, which are to carry out an operation of this priority. In this manner, a specific association is given at all times between the AB-numbers on the one hand as internal register addresses and the VE-numbers on the other hand as word contents of the register. In the example of FIG. 3, a VE-number is clearly determined through four places. A fifth place, which is designated in FIG. 3 with K indicates whether any entry whatever has taken place in the operation distribution register. This additional information is of advantage for the operation of the system because a demand will then not be processed, when this place is not located. Within the framework of the invention, it is also possible, to then locate the K-bit, when the AB-bit assigned to the VE-number contained at the affected place is also set. In this case, the distribution process is influenced over the set K-bit. On the one hand, the addresses of the AB-numbers are available at the point of the operation distribution register over the address input register AER and a decoding circuit D1, and the VE-numbers identifying the processing units are available at the input of the operation distribution register AVR over the word input register WER. As described, the AB-number serves as internal register address for a distribution process. Over an address control not here represented (which for example can be associated with the input register ER) the output word line associated with this address are controlled. The word read from the affected line which always represents the corresponding VE-number, is taken over in the word output register WAR and offered to the processing unit together with the information of the priority of operation, that is, the AB number in the described manner, after the completion of the operation distribution register cycle.

If, in contrast thereto, the association is to be determined, in reverse sequence, i.e., if the selection process described with reference to FIG. 2, is to be carried out, then the VE-number of the processing unit causing the selection process is available at the input of the operation distribution register; namely, on the word input lines of the input register WER. The selection in the operation distribution register begins with the beginning of a cycle of the operation distribution register AVR, i.e., with the release of the shift register timing T. As previously mentioned, the sequence of a register cycle is thereby of such a type that the highest value AB-numbers are checked first. In the example of FIG. 3, they are the AB-bit-numbers 1 through 7, which form a first group. If, as indicated in FIG. 3, through cross-hatching, for example, the VE-number VE1 is assigned to AB-numbers 3, 4 and 7 (which means that the VE-number VE1 has operations with the priorities 3, 4 and 7 to carry out) and if the fifth place K is set ("1") only in the lines of the operation distribution register AVR which lines are assigned to the AB-numbers 3 and 4, then after release of the shift register timing T, the entire contents of the group containing the highest value AB-numbers (AB-numbers 1 through 7) is taken over in the identification device ID with the first shift timing signal. There, the VE-number of the processing unit causing the selection process, that is to say, the VE-number VE1 is also available. At the output of the identification device ID, there arises, corresponding to the conditions (assumptions) pertaining to this example, a criterion on two of a total of eight lines. In the operation checking device ABP, which receives information about the corresponding AB-number set (located) in the first part I of the operation demand register ABAR over the demand selection control AW, it is determined which of the AB-numbers of this group determined through the association are set. To be sure, this process could be left out, when as previously mentioned, a K-bit is only then set, when the corresponding AB-number is also set. In the present example, which proceeds from the assumption, that an individual operation demand register is present, only the places corresponding to the AB-numbers 3 and 4 are set, so that the result of a "two to eight" - test is passed on to the intermediate register ZR. If only one AB-number were set, then this result could be coded in the coding device Cod without further handling and passed on over the address output register AAR. In the example, of FIG. 3, however, a priority selection is still necessary, which priority selection is carried out in the selection logic AWL according to known principles and as a result of which the highest value AB-number, that is, the AD number three reaches the coding device Cod.

The selection of the VE-numbers associated in a given case with the following AB-numbers (8–15; 16–33;. . . 56–63) takes place during the following timing impulse within a single operation distribution register cycle. Because of the fact that in any given case, eight lines of the operation distribution register can simultaneously be brought into the selection process with one shift timing impulse, a selection process of this type for the entire operation distribution register can be completed within eight shift register timing impulses.

Based on this associative manner of operation of the operation distribution register, it is also possible in an advantageous manner, to change the assignment between AB-numbers and VE-numbers in the operation distribution register AVL. As mentioned, for this case, an appropriate command as a control criterion ABAM is given to the operation control ABS, and this control information is transmitted by a program control unit provided to control the system simultaneously with the giving of a memory cycle demand to the memory input-output control SEAS. The word to be written in that is, the VE-number, as well as the address to be directed toward, that is, the AB-bit-numbers, are available at the input of the operation distribution register AVR over the word input register WER and address input register AAR. The writing in of the VE-number at the place indicated by the AB bit number takes place with one cycle of the operation distribution register AVR, that is, with the shift register timing impulse T. Upon reaching the specified address, i.e., the place indicated by the AB-number, the word to be written in is recorded bitwise in the operation distribution register AVR. For all subsequent processes, (distribution and selection), the new, again specific, association applies.

In all cases, in which a processing unit VE enters into connection with the operation demand control ABAS, through demand and assignment of a memory cycle, in order to set and to distribute operation demands or to select operation demands a read cycle initiated with the assignment of the memory cycle can also be executed in the memory units of the system.

The exemplary means for performing the process of this invention is described only to facilitate an understanding of the invention, and in no way is the above description to be considered as limiting the scope of the invention. The scope of the invention is defined by the appended claims.

I claim:

1. Apparatus for operating a program controlled data exchange system having at least one central memory constructed as a multistorage unit and containing the programs necessary for the operation of the system and having a plurality of processing units which alternately and cyclically operate with said central memory over a memory input-output control, comprising:

operation demand control means for reception, distribution and selection of operation demands sent by said processing units, operation distribution register in said operation demand control means containing information as to a specific association between the priority of each operation and the identity of the one of said processing units performing each said operation, said operation distribution register performing a seeking process using said priority information as an internal register address, means responsive to the result of said seeking process for identifying the one of said processing units carrying out each said operation, means for performing an associative seeking process comparing the entire contents of said operation distribution register with the information identifying the demanding processing unit and means utilizing the result of said comparison for producing information, stored for the demanding processing unit in said operation demand control means, concerning the highest priority value for an operation.

2. A method for the operation of a program controlled data exchange system having at least one central memory constructed as a multi storage unit and containing programs necessary for the operation of said exchange system, said exchange system having a plurality of processing units which alternately and cyclicly operate with said central memory over a memory input-output control according to the principle of demand and call-back, comprising the steps of:

distributing and selecting operation demands sent from said processing units in a central location utilizing, respectively, a common operation distribution register and an operation demand register, placing information in said operation distribution register regarding a specific association between a first unit of information concerning the priority of a given operation demand and a second unit of information regarding the processing unit wherein the said given operation demand shall be performed, storing said first unit of information in said operation demand register, decoding said first unit of information for addressing said operation distribution register and said operation demand register, generating, from a unit of control information, instruction signals for the individual functions of the operation distribution register and the said operation demand register.

3. The method defined in claim 2 comprising the further steps of:

addressing with said first unit of information a particular location in said operation distribution register, communicating said first unit of information, as well, directly to an address output register, storing said first unit of information in said operation demand register and storing said second unit of information, which was held in said address portion of said operation distribution register, in a word output register.

4. The method defined in claim 2 comprising the further steps of:

initiating an associative search process in said operation distribution register using said first unit of information, transferring the contents of the location in said operation distribution register reached through said process sequentially to a comparator means, said contents of said operation distribution register being said second unit of information, coupling said second unit of information, as well, to a word output register, comparing the result of said comparator means with the contents of said operation demand register and transferring a positive comparison result, after a priority selection in a priority selector circuit, to an address output register in encoded form.

* * * * *